United States Patent
Lietzenmaier

(10) Patent No.: US 9,869,367 B2
(45) Date of Patent: Jan. 16, 2018

(54) BALANCING ELEMENT FOR BALANCING A FRICTION CLUTCH, METHOD FOR BALANCING A FRICTION CLUTCH, AND THE USE OF A PART OF A FRICTION CLUTCH

(71) Applicant: Schaeffler Technologies AG & Co. KG, Herzogenaurach (DE)

(72) Inventor: Holger Lietzenmaier, Lauf (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 15/034,331

(22) PCT Filed: Oct. 20, 2014

(86) PCT No.: PCT/DE2014/200574
§ 371 (c)(1),
(2) Date: May 4, 2016

(87) PCT Pub. No.: WO2015/067267
PCT Pub. Date: May 14, 2015

(65) Prior Publication Data
US 2016/0298724 A1    Oct. 13, 2016

(30) Foreign Application Priority Data

Nov. 6, 2013 (DE) .................. 10 2013 222 551

(51) Int. Cl.
*F16F 15/34* (2006.01)
*F16D 13/64* (2006.01)

(52) U.S. Cl.
CPC .............. *F16F 15/34* (2013.01); *F16D 13/64* (2013.01); *F16D 2250/0084* (2013.01); *F16D 2300/00* (2013.01)

(58) Field of Classification Search
CPC .................................................. F16D 2300/00
See application file for complete search history.

(56) References Cited

U.S. PATENT DOCUMENTS

| 4,202,243 A | 5/1980 | Leonhardt |
| 4,417,651 A * | 11/1983 | Lu .......................... F16D 13/585 192/112 |

(Continued)

FOREIGN PATENT DOCUMENTS

| CN | 1126287 A | 7/1996 |
| CN | 201723542 U | 1/2011 |

(Continued)

OTHER PUBLICATIONS

Chinese Office Action for Chinese Application No. 201480060808.7 dated Jan. 18, 2017.

*Primary Examiner* — Mark A Manley
(74) *Attorney, Agent, or Firm* — Volpe and Koenig, P.C.

(57) ABSTRACT

A balancing element for balancing a friction clutch, including a balancing head for providing a balancing mass, and a shaft that is connected to the balancing head, is to be inserted into an opening in the friction clutch, and has a shaft end which points away from the balancing head and which includes a face pointing away from the balancing head substantially in the axial direction of the shaft. The shaft end has a weakening in the material in a subsection between the face and the balancing head in order for the shaft end to plastically deform radially outward in relation to the longitudinal axis of the shaft when a compressive force is applied to the balancing head in the axial direction. This especially allows the face of the shaft end to about a part of the friction clutch once the shaft has been introduced into a receiving opening in the friction clutch, and makes it possible to apply a compressive force to the balancing head in the direction of insertion, said compressive force being so great that the shaft (Continued)

end is plastically deformed in a particularly easy manner in the region of the weakening in the material such that a secure form-fitting connection is established, thereby preventing the balancing element from coming loose again even when the assembly space is tight and keeping the risk of the friction clutch becoming unbalanced low during the entire service life of the friction clutch.

11 Claims, 2 Drawing Sheets

(56) References Cited

U.S. PATENT DOCUMENTS

| | | | | |
|---|---|---|---|---|
| 4,591,041 | A | * | 5/1986 | Valier ............... F16D 13/58 192/107 R |
| 4,778,040 | A | * | 10/1988 | Kabayama .......... F16D 13/58 192/110 R |
| 5,632,365 | A | | 5/1997 | Maucher |
| 2011/0088992 | A1 | * | 4/2011 | Lindemann .......... F16H 45/02 192/30 R |

FOREIGN PATENT DOCUMENTS

| | | |
|---|---|---|
| DE | 102010053933 | 6/2011 |
| GB | 2214999 | 9/1989 |

* cited by examiner

BALANCING ELEMENT FOR BALANCING A FRICTION CLUTCH, METHOD FOR BALANCING A FRICTION CLUTCH, AND THE USE OF A PART OF A FRICTION CLUTCH

BACKGROUND

The invention relates to a balancing element for balancing a friction clutch, a method for balancing a friction clutch, as well as the use of a part of a friction clutch, with the help of which any imbalances caused by production tolerances of a friction clutch can be balanced.

It is known to balance a friction clutch such that massive weights are adhered at suitable positions to the part of the friction clutch and/or fastened thereat in a friction-fitting fashion, for example via a shaft impressed into a receiving opening. Usually the balancing element embodied as a weight can only be accessed from an axial side of the friction clutch.

There is a constant need to avoid imbalances in friction clutches.

SUMMARY

The objective of the invention is to provide measures which allow for a low risk of imbalances at a friction clutch.

The objective is attained according to the invention in a balancing element, a method, as well as a use having one or more features of the invention. Preferred embodiments of the invention are stated below and in the claims, and here each of which may represent an aspect of the invention individually or in combinations.

According to the invention, a balancing element for balancing the friction clutch is provided, comprising a balancing head for providing a balancing mass and a shaft connected to the balancing head to be inserted in an opening of the friction clutch, with the shaft comprising a shaft end, pointing away from the balancing head, and having a face pointing essentially away from the balancing head in the axial direction of the shaft, with the shaft end comprising in a section between the face and the balancing head a weakening of the material for the plastic deformation of the shaft end radially outward from the longitudinal axis of the shaft, with a compressive force being applied in the axial direction upon the balancing head.

The weakening of the material of the shaft in the area of the shaft end allows with little expense to deform the shaft plastically such that the balancing element can be connected to a part of the friction clutch in a form-fitting fashion. In particular, the balancing element can be inserted with the shaft into a receiving opening of the carrier sheet, which is formed by the part of the frictional clutch, until at least a portion of the weakening of the material of the shaft end projects again out of the receiving opening. The shaft end can then be plastically deformed at a defined point in the area of the weakening of the material so that a part of the shaft end engages behind the receiving opening. The carrier sheet can then be accepted and captivated between the deformed part of the shaft end and the balancing head. The plastic deformation can for example occur by an intentional part failure, for example bending and/or buckling and/or by a deformation of at least a part of the shaft end with a portion perpendicular in reference to the original longitudinal extension of the shaft. This way, a form-fitting connection of the balance element occurs with the friction clutch, which during regular operation of the friction clutch is not separated, not even under centrifugal influences. The risk of separation of a friction-fitting connection and/or an adhesive layer, particularly when vibrations occur, can therefore be avoided. The balancing element can be connected to the friction clutch similar to a rivet connection, with the balancing element exhibiting in the shaft end the intentionally provided material weakness, unlike a rivet connection. The shaft end can here act as a locking head and the balancing head as a die head. By weakening of the material, compared to rivet connections, here lower forces are required in order to plastically deform the shaft end. This way, it is possible in particular that after insertion of the shaft into a receiving opening of the friction clutch, the shaft end impinges with its face a part of the friction clutch and here applies a strong compressive force in the direction of insertion of the balancing element upon the balancing head such that the shaft end, in the area of the weakening of the material, is particularly easily deformed in a plastic fashion in order to form the captivating form-fitting connection, so that a subsequent detaching of the balancing element is avoided even at tight structural spaces and it is possible to show low risk for imbalances at the friction clutch over the service life of the friction clutch.

The shaft end is a part of the shaft, which extends in the longitudinal direction of the shaft from the weakening of the material to the face. The shaft end, the shaft, and the balancing head can be embodied particularly in one piece. Preferably the balancing head projects in the radial direction from the shaft at least in a partial area so that the balancing head can limit the maximum insertion depth of the balancing element in the receiving opening. In particular, the balancing head and the shaft are embodied as cylinders, preferably as solid cylinders, perhaps except for the area of the weakening of the material, with particularly the balancing head being arranged concentrically in reference to the shaft. Preferably the balancing head has a greater diameter than the shaft. The balancing head may particularly represent the majority of the inert mass of the balancing element. By the form-fitting and captivating connection of the balancing element to the friction clutch, it can be permitted that the focal point of the weight of the balancing element is positioned axially next to the receiving opening for the balancing element in a carrier sheet. The part of the shaft end engaging behind the carrier sheet can easily be sized sufficiently large such that any lever force of the balancing head under centrifugal influence and/or during vibrations cannot release the form-fitting connection of the balancing element to the carrier sheet. In particular, no separate tool is required for the plastic deformation of the shaft end. Instead, a part of the friction clutch can be used as the counterpart holding the shaft end. This way, in tight spaces, the friction clutch can even advantageously be used for a particularly long-lasting and stable connection of the balancing element to the friction clutch.

In particular, the shaft end shows a material recess to form the weakening of the material. By the material recess an intentional bending or buckling can be provided at sufficiently strong compressive forces at a defined position. For example, a lateral recess extending perpendicular in reference to the longitudinal direction of the shaft in the radial direction may be provided, resulting in a defined axis of bending, in order to allow a part of the shaft end laterally bending away from the balancing head in order to engage behind the carrier sheet for a captivating form-fitting connection.

In order to form the weakening of the material, preferably the shaft end comprises a penetrating opening, particularly a lateral bore hole. A wall may remain between the penetrating opening and the casing area of the shaft end pointing radially towards the outside, which under compressive forces in the longitudinal direction of the shaft can bulge radially towards the outside and here plastically deform. After the deformation the wall can form a hook-like undercut, allowing a captivating form-fitting connection.

It is particularly preferred for the penetrating opening to show a central line intersecting the longitudinal axis of the shaft. This way, two essentially identically thick walls result between the penetrating opening and the jacket area of the shaft end, which can deform plastically under load essentially at the same time. The shaft end can therefore be deformed similar to a dowel. A lateral bending off the shaft end can therefore be avoided.

In particular, the shaft end may have from the weakening of the material to the face in the longitudinal direction a length S and the penetrating opening a mean diameter D, with it applying $0.90 \geq D/S \geq 0.40$, particularly $0.80 \geq D/S \geq 0.50$, preferably $0.70 \geq D/S \geq 0.60$, and particularly preferred $D/S=0.65 \pm 0.02$. Preferably the shaft shows a diameter d, with it applying $0.30 \leq D/d \leq 0.70$, particularly $0.40 \leq D/d \leq 0.60$, preferably $0.45 \leq D/d \leq 0.55$, and particularly preferred $D/d=0.50 \pm 0.03$. This way the balancing element can easily be connected in a form-fitting fashion to a sufficiently thick metal carrier sheet, with here in particular for the plastic deformation of a wall remaining between the penetrating opening and the jacket area of the shaft relatively weak forces being required.

Preferably the shaft has a length L from the balancing head to the face in the longitudinal direction, and the shaft end has a length S from the weakening of the material to the face in the longitudinal direction, with it applying $0.05 \leq S/L \leq 0.50$, particularly $0.15 \leq S/L \leq 0.40$, preferably $0.20 \leq S/L \leq 0.30$, and particularly preferred $S/L=0.25 \pm 0.03$. The shaft end therefore must be embodied with a sufficiently inherently stable connection in the plastically deformed state, allowing the avoidance of any unnecessary large material to be used.

The invention further relates to a friction clutch for coupling a drive shaft of a motor vehicle engine to at least one transmission input shaft of a motor vehicle transmission, to a first part forming a carrier sheet, particularly a clutch cover, a balancing element received in a receiving opening of the carrier sheet, which may be embodied as described above and further developed, with here particularly opposite the face of the balancing element a second part being provided perhaps, particularly a flywheel for compressing a clutch disk with the help of a compression plate that can be displaced in reference to the flywheel, with particularly the second part contacting the face of the balancing element in the plastically deformed state of the shaft end. This way it is particularly possible, after the shaft has been inserted in a receiving opening of the friction clutch, to allow the shaft end impinging with its face a part of the friction clutch and applying such a high compressive force in the direction of insertion of the balancing element upon the balancing head that the shaft end, in the area of the weakening of the material, is plastically deformed in a particularly easy fashion in order to form the captivating form-fitting connection, so that a subsequent separation of the balancing element is avoided even in tight structural circumstances and the risk for imbalances can be kept low in the friction clutch over the service life of said friction clutch.

The invention further relates to a method for balancing a friction clutch, in which a balancing element which can be embodied as described above and further developed, is inserted in a receiving opening of a carrier sheet of the friction clutch, subsequently the face of the balancing element impinges a part of the friction clutch, with the balancing head of the balancing element being distanced from the carrier sheet when the face impinges the part, and then the balancing element is inserted further into the receiving opening until the balancing head contacts the carrier sheet, with the shaft end of the balancing element being plastically deformed to generate a captivating connection of the balancing element with the carrier sheet from the part, particularly to form a friction clutch, which may be embodied as described above or further developed. This way, after the insertion of the shaft in a receiving opening of the friction clutch, it is particularly possible to allow the shaft end impinging with its face a part of the friction clutch and to apply such a high compressive force in the direction of insertion of the balancing element upon the balancing head that the shaft end in the area of the weakening of the material is plastically deformed in a particularly simple fashion to generate a captivating form-fitting connection such that a subsequent separation of the balancing element is avoided even in tight spatial conditions, and a low risk for imbalances is given for the friction clutch over the service life of said friction clutch.

Preferably, when the face impinges the part, the weakening of the material, particularly the penetrating opening, is partially positioned inside the receiving opening. The part of the weakening of the material already projecting out of the penetrating opening may already be deformed such that the balancing element can be inserted further into the penetrating opening. This way, an even greater part of the weakening of the material can project out of the penetrating opening and deflect radially towards the outside. When the balancing head impinges the carrier sheet the balancing element is connected to the carrier sheet with a corresponding low play in the longitudinal direction of the shaft. Preferably the play is minimal and may amount almost zero. For this purpose, for example a part of the weakening of the material may remain in the penetrating opening when the balancing head impinges the carrier sheet, with here the portion of the weakening of the material remaining in the penetrating opening being particularly minimal or negligible.

The invention further relates to the use of a part of a friction clutch as a counter fastener to form a closing head by plastically deforming a shaft end of a balancing element guided through an opening of the friction clutch, which may particularly be embodied as described above or further developed, in order to balance the friction clutch. This way it is particularly possible, after inserting the shaft into a receiving opening of the friction clutch, to allow the shaft end with its face to impinge the part of the friction clutch serving as a counter fastener and to apply such a high compressive force in the direction of insertion of the balancing element upon the balancing head that the shaft end, in the area of the weakening of the material, is plastically deformed in a particular simple fashion to form the captivating form-fitting connection such that any subsequent release of the balancing element is avoided even in tight structural conditions, and over the service life of the friction clutch a low risk is given for imbalances in the friction clutch.

BRIEF DESCRIPTION OF THE DRAWINGS

In the following the invention is explained with reference to the attached drawings based on preferred exemplary embodiments, with the features shown in the following each representing an aspect of the invention, either individually or in combinations. Shown are.

DETAILED DESCRIPTION OF THE PREFERRED EMBODIMENTS

Figure 1:
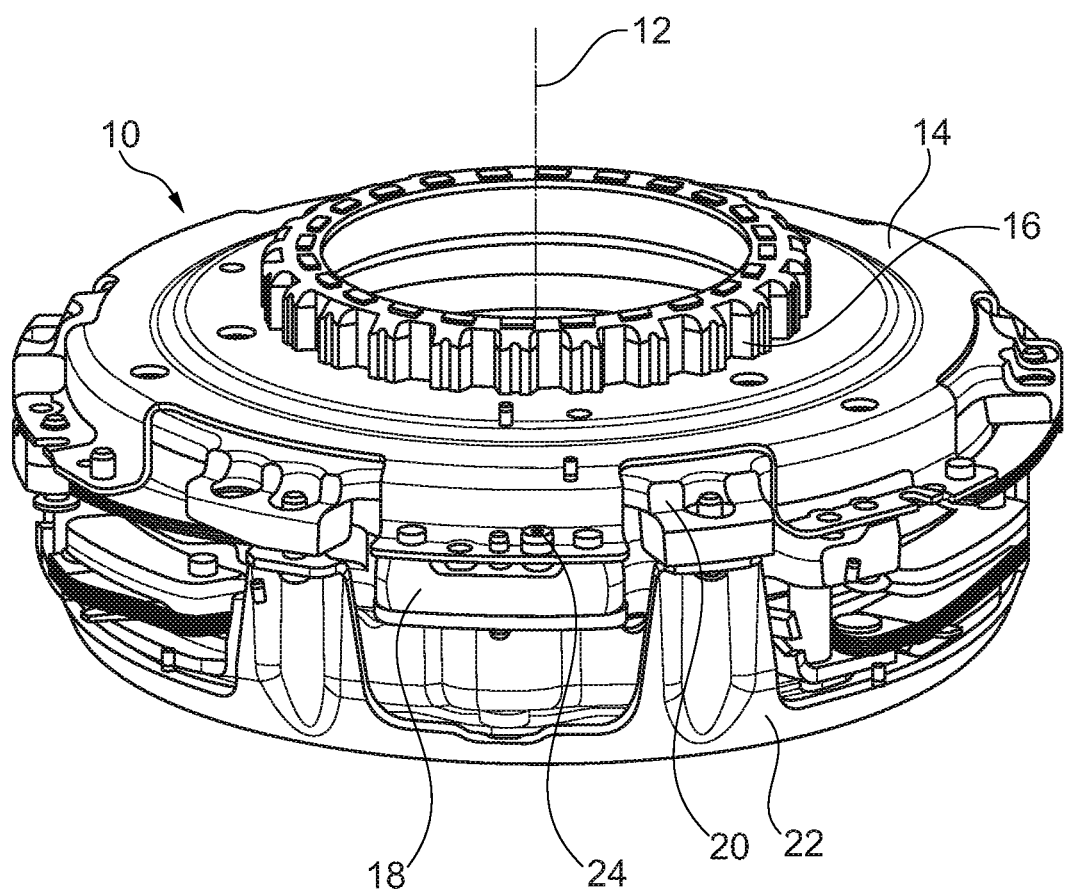
FIG. 1: a schematic perspective view of a friction clutch.

The friction clutch 10 shown in FIG. 1 for coupling a drive shaft of a motor vehicle engine to at least a transmission input shaft of a motor vehicle transmission is rotational about an axis of rotation 12. The friction clutch 10 has a clutch cover 14, which can be connected rotationally via a spline 16 to the drive shaft in a torque-proof fashion, in order to introduce the torque of the motor vehicle engine into the friction clutch 10. The clutch cover 14 is connected to a flywheel in the form of a counter plate 18, which, with the help of a compression plate 20 that is axially displaceable in reference to the counter plate 18, can compress in a friction-fitting fashion a clutch disk connected to the transmission input shaft in a torque-proof fashion. A displacement element 22 embodied as a tie rod is connected to the compression plate 20, and the element can be moved with the help of a particularly hydraulic actuating device in order to open and/or close a friction clutch 10 by way of displacement of the compression plate 20. In the exemplary embodiment shown a balancing element 24 is connected to the clutch cover 14.

Figure 2:
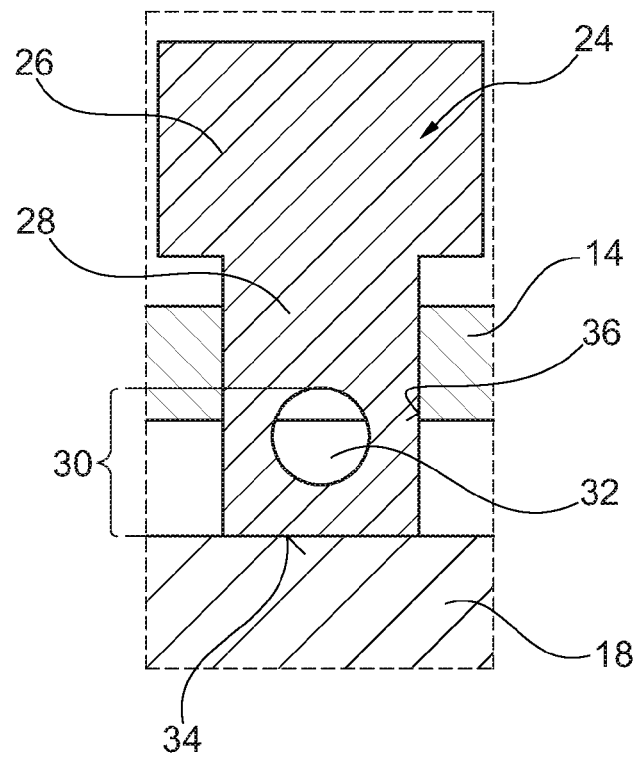
FIG. 2: a schematic cross-section of a balancing element of the friction clutch of FIG. 1 before the plastic deformation.

As shown in FIG. 2, the balancing element 24 includes a balancing head 26, from which a concentrically arranged shaft 28 projects. The shaft 28 has a shaft end 30, which begins at a weakening of the material 32, intentionally provided as a lateral bore, and ends at a face 34 of the shaft 28 pointing away from the balancing head 26. In order to fasten the balancing element 24 to the friction clutch 10 the balancing element 24 is first inserted into a receiving opening 36 of the clutch cover 14 acting as a carrier sheet. Due to the limited structural space the shaft end 30 is hardly accessible during the assembly and impinges with its face 34 the counter plate 18. In this position a part of the weakening of the material 32 is positioned in the penetrating opening 36, while another part of the weakening of the material 32 projects from the penetrating opening 36.

Figure 3:
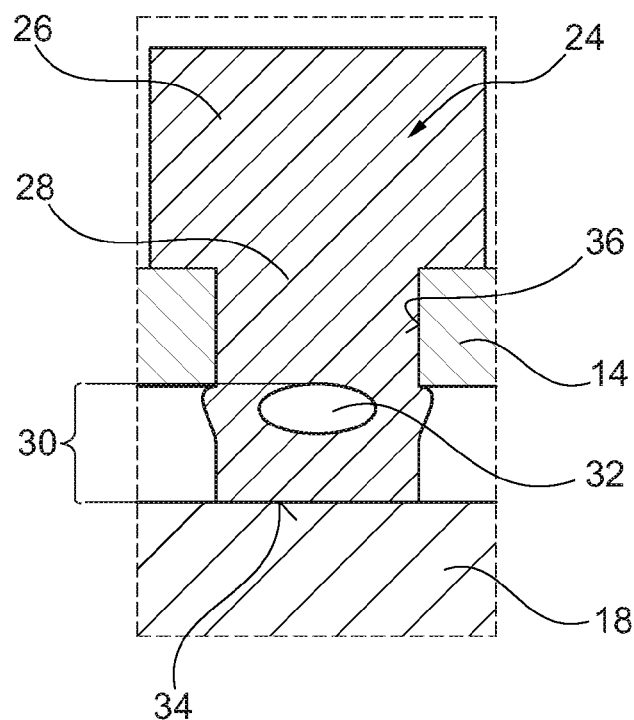
FIG. 3: a schematic cross-section of the balancing element of FIG. 2 after a plastic deformation.

As shown in FIG. 3, a compression can be applied upon the balancing head 26 in the longitudinal direction of the shaft 30, which is so strong that a part of the shaft end 30 is plastically deformed towards the outside in the area of the weakening of the material 32. Here, the face 34 remains in contact with the counter holder for a counter plate 18 acting as a rivet connection, which compared to the area of the weakening of the material 32 of the shaft end 30 shows a considerably higher strength. The plastically deformed part of the shaft end 30 can this way engage behind the clutch cover 14, resulting in the formation of a captivating form-fitting connection of the balancing element 24 to the friction clutch 10.

LIST OF REFERENCE CHARACTERS

10 Friction clutch
12 Axis of rotation
14 Clutch cover
16 Spline
18 Counter plate
20 Compression plate
22 Displacement element
24 Balancing element
26 Balancing head
28 Shaft
30 Shaft end
32 Weakening of the material
34 Face
36 Receiving opening

The invention claimed is:

1. A balancing element for balancing a friction clutch comprising a balancing head for providing a balancing weight and a shaft connected to the balancing head to be inserted in and extend through an opening of the friction clutch, the shaft comprising a shaft end essentially pointing away from the balancing head, having an end face essentially in an axial direction of the shaft and pointing away from the balancing head, the shaft end, in a part between the end face and the balancing head, comprising a weakening of material adapted for plastic deformation of the shaft end radially outward from a longitudinal axis of the shaft upon application of a compression force upon the balancing head in the axial direction, the weakening of material being axially spaced away from the end face of the shaft.

2. The balancing element according to claim 1, wherein the shaft end comprises a material recess to form the weakening of material.

3. The balancing element according to claim 1, wherein the shaft end comprises a penetrating opening to form the weakening of material.

4. The balancing element according to claim 3, wherein the penetrating opening has a central line intersecting a longitudinal axis of the shaft.

5. The balancing element according to claim 3, the shaft end has a length S from the weakening of material to the end face in a longitudinal direction, wherein the penetrating opening has an average diameter D, wherein $0.90 \geq D/S \geq 0.40$.

6. A friction clutch for coupling a drive shaft of a motor vehicle engine to at least one transmission input shaft of a motor vehicle transmission, comprising a first part embodied as a carrier sheet, a balancing element received in a receiving opening of the carrier sheet according to claim 1, and a second part being provided to compress a clutch disk in connection with a compression plate that is displaceable in reference to the second part, with the second part contacting the end face of the balancing element in a plastically deformed state of the shaft end.

7. A method for balancing a friction clutch, comprising inserting a balancing element according to claim 1, into a receiving opening of a carrier sheet of a friction clutch, subsequently the end face of the balancing element impinging a part of the friction clutch, with the balancing head of the balancing element being spaced apart from the carrier sheet when the end face impinges the part, and subsequently further inserting the balancing element into the receiving opening until the balancing head contacts the carrier sheet, with the shaft end of the balancing element plastically deforming by contact with the part to form a captivating connection of the balancing element to the carrier sheet.

8. The method according to claim 7, wherein during the impinging of the end face at the part the weakening of material is partially positioned inside the receiving opening.

9. A method for balancing a friction clutch, comprising using a part of a friction clutch as a counter holder to form a closing head by plastically deforming an end of a shaft of a balancing element guided through an opening of the friction clutch, wherein the shaft includes a weakening of material adapted for plastic deformation upon application of a compression force in an axial direction, and the weakening of material is spaced away from axial end faces of the shaft.

10. A balancing element for balancing a friction clutch comprising a balancing head for providing a balancing weight and a shaft connected to the balancing head to be inserted in an opening of the friction clutch, the shaft comprising a shaft end essentially pointing away from the balancing head, having a face essentially in an axial direction of the shaft and pointing away from the balancing head, the shaft end, in a part between the face and the balancing head, comprising a weakening of material adapted for plastic deformation of the shaft end radially outward from a longitudinal axis of the shaft upon application of a compression force upon the balancing head in the axial direction, wherein the shaft end comprises a penetrating opening to form the weakening of material, and the penetrating opening is a lateral bore.

11. The balancing element according to claim 1, wherein the shaft has a length L from the balancing head to the end face in a longitudinal direction, and the shaft end has a length S from the weakening of material to the end face in the longitudinal direction, wherein $0.05 \leq S/L \leq 0.50$.

* * * * *